(12) United States Patent
Kanno

(10) Patent No.: US 9,672,457 B2
(45) Date of Patent: Jun. 6, 2017

(54) IMAGE FORMING APPARATUS CAPABLE OF CHANGING CUT POSITION ON LONG MEDIUM AND CONTROL METHOD THEREOF

(71) Applicant: Oki Data Corporation, Tokyo (JP)

(72) Inventor: Hiroyuki Kanno, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/051,276

(22) Filed: Feb. 23, 2016

(65) Prior Publication Data

US 2016/0275387 A1    Sep. 22, 2016

(30) Foreign Application Priority Data

Mar. 16, 2015    (JP) ................................. 2015-052009

(51) Int. Cl.
  *G06K 15/00* (2006.01)
  *G06K 15/02* (2006.01)
  *H04N 1/00* (2006.01)

(52) U.S. Cl.
  CPC ....... *G06K 15/4025* (2013.01); *G06K 15/022* (2013.01); *H04N 1/0032* (2013.01); *H04N 2201/0094* (2013.01)

(58) Field of Classification Search
  None
  See application file for complete search history.

(56) References Cited

U.S. PATENT DOCUMENTS

| | | | | |
|---|---|---|---|---|
| 6,340,255 | B1 * | 1/2002 | Konishi | B41J 11/663 400/61 |
| 6,633,740 | B2 * | 10/2003 | Estabrooks | B41J 11/42 399/299 |
| 8,998,600 | B1 * | 4/2015 | Lee | B29C 66/863 264/31 |
| 2003/0059564 | A1 * | 3/2003 | Ogino | B32B 27/06 428/40.1 |
| 2004/0026024 | A1 * | 2/2004 | Nakasaka | B65C 11/006 156/250 |
| 2005/0041075 | A1 * | 2/2005 | Fujioka | B41J 2/17596 347/85 |
| 2006/0067777 | A1 * | 3/2006 | Koga | B41J 11/425 400/624 |

(Continued)

FOREIGN PATENT DOCUMENTS

JP    2000-071548 A    3/2000

*Primary Examiner* — Ming Hon
(74) *Attorney, Agent, or Firm* — Muncy, Geissler, Olds & Lowe, P.C.

(57) ABSTRACT

An image forming apparatus, provided with an image forming part that performs an image formation on each of individual medium pieces that are attached to a long base sheet with specified gaps wherein a long medium is configured with the long base sheet and the medium pieces, a length of the gaps being defined as a gap length, a carrying part that carries the long medium to the image forming part in a medium carrying direction, a cutting part that cuts the long medium that is being carried by the carrying part, and a cut position determining part that determines a cut position where the long medium is cut by the cutting part, the cut position being located at one of the gaps, wherein the cut position determining part changes the cut position according to the gap length.

13 Claims, 10 Drawing Sheets

(56) References Cited

U.S. PATENT DOCUMENTS

| | | | | |
|---|---|---|---|---|
| 2008/0267685 | A1* | 10/2008 | Moriyama | B41J 3/4075 400/613 |
| 2012/0243049 | A1* | 9/2012 | Takayama | B41J 11/703 358/1.18 |
| 2013/0301063 | A1* | 11/2013 | Ishii | G06K 15/024 358/1.6 |
| 2014/0036280 | A1* | 2/2014 | Kirita | B41J 3/01 358/1.6 |

* cited by examiner

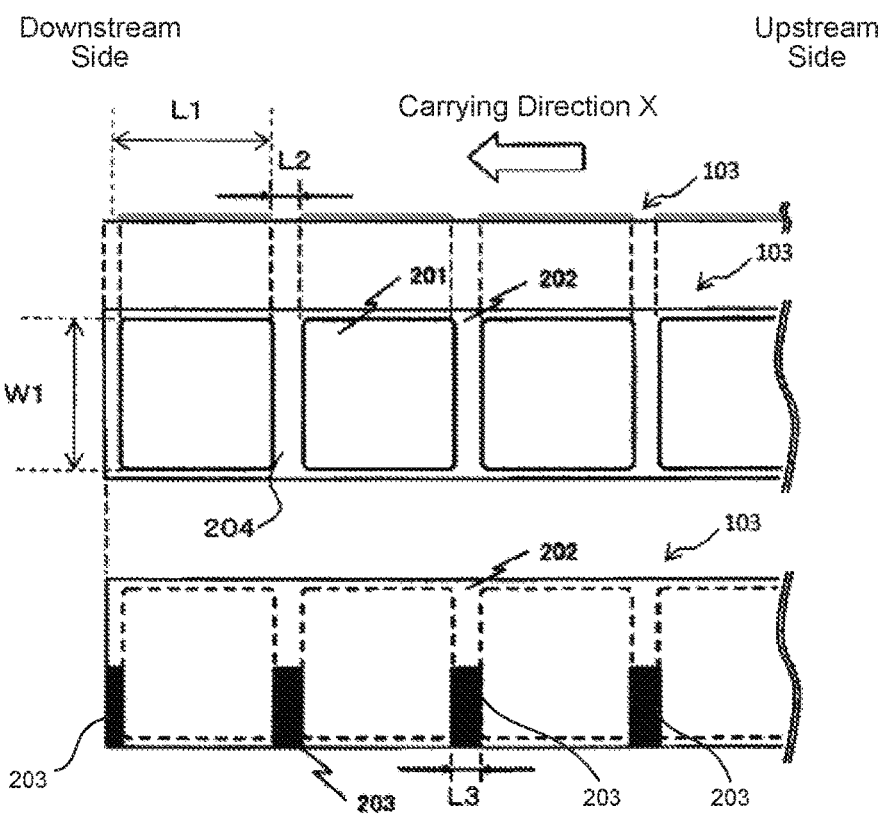

*Fig. 5*

| Medium Sizes | | | | Type Of Medium (Medium Material) |
|---|---|---|---|---|
| Label Length | Label Width | Gap Length | Cut Position | |
| L1 | W1 | L2 | L4 | Synthetic Paper |

*Fig. 6*

| Type Of Medium | Thermal Contraction (Large / Small) | Ref. Value |
|---|---|---|
| Plain Paper | Small | ----- |
| PET | Large | 1.3 mm |
| Urethane | Large | 1.5 mm |
| Synthetic Paper | Large | 1.7 mm |
| ... | ... | ... |

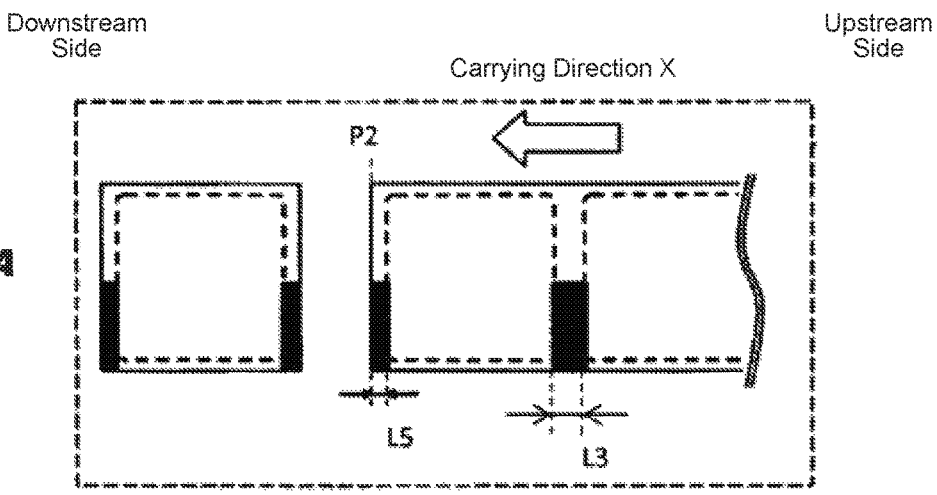
Fig. 10A
Fig. 10B
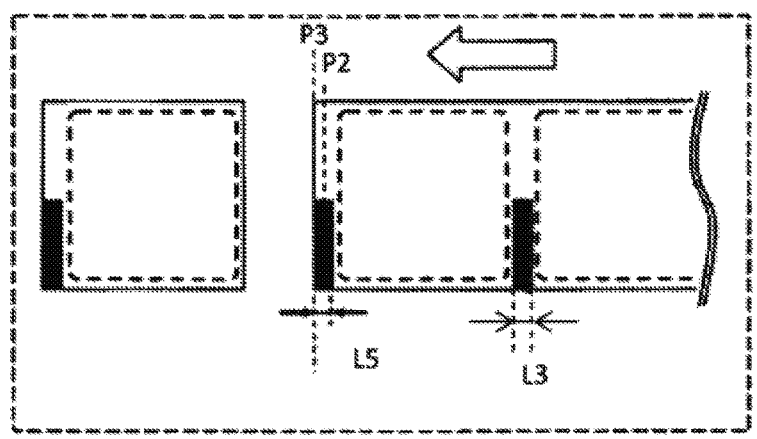
Fig. 11
| Medium Sizes | | | | Type Of Medium (Medium Material) | Black Mark Length Ref. Value |
|---|---|---|---|---|---|
| Label Length | Label Width | Gap Length | Cut Position | | |
| L1 | W1 | L2 | Central Position Of Black Mark | PET | L5 |

IMAGE FORMING APPARATUS CAPABLE OF CHANGING CUT POSITION ON LONG MEDIUM AND CONTROL METHOD THEREOF

CROSS REFERENCE TO RELATED APPLICATIONS

This application claims priority under 35 USC 119 to Japanese Patent Application No. 2015-052009 filed on Mar. 16, 2015, the entire contents which are incorporated herein by reference.

TECHNICAL FIELD

This invention relates to an image forming apparatus and an image forming apparatus control method, and can be applied, for example, to a printer that performs an image formation and cutting to a long size medium.

BACKGROUND

Conventionally, in an image forming apparatus that forms an image on a long-size medium (hereafter, also called "long medium") such as a rolled sheet of paper, not only a print process but also a process to cut the medium is performed. Then, in an image forming apparatus supporting a conventional long medium, in order to detect a cut position or a print start position, alignment references such as black color marks (hereafter, also called "black marks") displayed on the long medium and the edges of labels formed on the long medium are determined. In an image forming apparatus supporting a conventional long medium, the positions of such alignment references as mentioned above are detected using an optical sensor (for example, a reflection sensor or a transmission sensor).

As an image forming apparatus supporting a conventional long medium, for example, there is an apparatus according to Patent Document 1. In the image forming apparatus according to Patent Document 1, when using a long medium where labels are temporarily attached to a long shape base sheet, the outer shapes of the labels are detected using a transmission sensor. Also, in the image forming apparatus according to Patent Document 1, when using a long medium where black marks are printed with constant gaps, the black marks are detected using a reflection sensor.

RELATED ART

[Patent Document 1] Unexamined Japanese Patent Application 2000-71548

However, in a conventional electrophotographic image forming apparatus, after transferring a developer image to a medium, there required is a fusing process that fuses the developer image to the medium with heat and a pressure. Therefore, in an electrophotographic image forming apparatus supporting a long medium, the medium may thermally contract by the heat in the fusing process and its size may change. In a conventional electrophotographic image forming apparatus, when cutting a long medium in the upstream size of the print process, the influence of the medium size change by thermal contraction is not taken into account. In an electrophotographic image forming apparatus having a fuser, because printing is complete by going through processes of image formation and fusing after cut a long medium, it is different from a thermal printer or an inkjet printer that cuts a long medium after printing is complete.

Also, in a conventional image forming apparatus supporting a long medium, the influence of the black mark size change after cut the black marks on the writing position is not taken into account. For example, in a conventional image forming apparatus, when cutting a medium where labels are temporarily attached to a long shape base sheet, the cutting is performed between the labels or in reference to the black marks.

In a conventional image forming apparatus, the cut position is generally set to the intermediate position between labels. The purpose is to prevent mistakenly cutting the labels when the cut position is somewhat shifted.

In a conventional image forming apparatus, when performing an image formation on a medium having black marks disposed between labels, the central part of each of the black marks would be cut. Because a thermal printer or an inkjet printer performs cutting after printing, black marks are not used after cut. However, in a conventional electrophotographic image forming apparatus, an image forming part that performs positioning using black marks is usually disposed in the downstream side of a cutter. Therefore, in a conventional image forming apparatus, when performing an image formation, the black mark length decreases from the original one. Thereby, in a conventional electrophotographic image forming apparatus, its sensor detection error would increase, and its print start position may shift. Also, in a conventional electrophotographic image forming apparatus, when a medium is cut, if the black marks become too short, the black marks after cut may not be detectable by its sensor.

In a conventional electrophotographic image forming apparatus, when performing an image formation on a medium where labels are temporarily attached to a long shape base sheet, the base sheet portion between labels is cut so that the size from the label edge to the edge of the cut base sheet becomes about several mm. This is to prevent the adhesive portion on the backside of a label from touching a carrying path and becoming a cause of jam occurrence. For example, if a label peels off the base sheet, the adhesive portion sticks to a carrying path inside the image forming apparatus and becomes a cause of jam occurrence. Further, in a conventional electrophotographic image forming apparatus, the label part may stick out from the leading edge of the base sheet part due to thermal contraction. In this case, because an adhesive material of the label is exposed from the base sheet and the label becomes easy to peel off, causing it to stick onto a carrying path or a fuser inside the image forming apparatus.

Considering such problems as the above, desired are an image forming apparatus and an image forming apparatus control method that can stably perform a medium carriage and an image formation by reducing the risks of print position shifts and jam occurrences in cutting a long medium and performing an image formation.

SUMMARY

An image forming apparatus disclosed in the application is provided with an image forming part that performs an image formation on each of individual medium pieces that are attached to a long base sheet with specified gaps wherein a long medium is configured with the long base sheet and the medium pieces, a length of the gaps being defined as a gap length, a carrying part that carries the long medium to the image forming part in a medium carrying direction, a cutting part that cuts the long medium that is being carried by the carrying part, and a cut position determining part that determines a cut position where the long medium is cut by the cutting part, the cut position being located at one of the gaps, wherein the cut position determining part changes the cut position according to the gap length.

An image forming apparatus control method that are performed with an image forming part, a carrying part, a cutting part, and a cut position determining part, disclosed in the application includes the image forming part performing an image formation on each of individual medium pieces that are attached to a long base sheet with specified gaps wherein a long medium is configured with the long base sheet and the medium pieces, the carrying part carrying the long medium to the image forming part, the cutting part cutting the long medium being carried by the carrying part, the cut position determining part determining a cut position where the long medium is cut by the cutting part, and the cut position determining part changing the cut position according to either a gap length or a mark length of a mark for positioning. The gap length is defined as a length between two of the neighboring labels on the base sheet, and the mark for positioning is defined as a mark provided between the neighboring medium pieces on the base sheet.

According to this invention, in cutting a long medium and performing an image formation, a medium carriage and the image formation can be stably performed by reducing the risks of print position shifts and jam occurrences.

BRIEF DESCRIPTION OF THE DRAWINGS

FIGS. 3A through 3C are drawings showing the configuration of a medium used in the image forming apparatus of the first embodiment.

FIG. 5 is an explanatory table showing a configuration example of medium setting information stored in the image forming apparatus of the first embodiment.

FIG. 6 is an explanatory table showing a configuration example of medium type information stored in the image forming apparatus of the first embodiment.

FIGS. 10A and 10B are explanatory diagrams showing the states of black marks (black mark lengths) after the medium of the second embodiment is cut.

FIG. 11 is an explanatory diagram showing a configuration example of medium setting information stored in the image forming apparatus of the second embodiment.

DETAILED DESCRIPTION OF THE EMBODIMENT(S)

(A) First Embodiment

Below, the first embodiment of an image forming apparatus and an image forming apparatus control method according to this invention is explained in detail referring to drawings.

(A-1) Configuration of the First Embodiment

Figure 2:
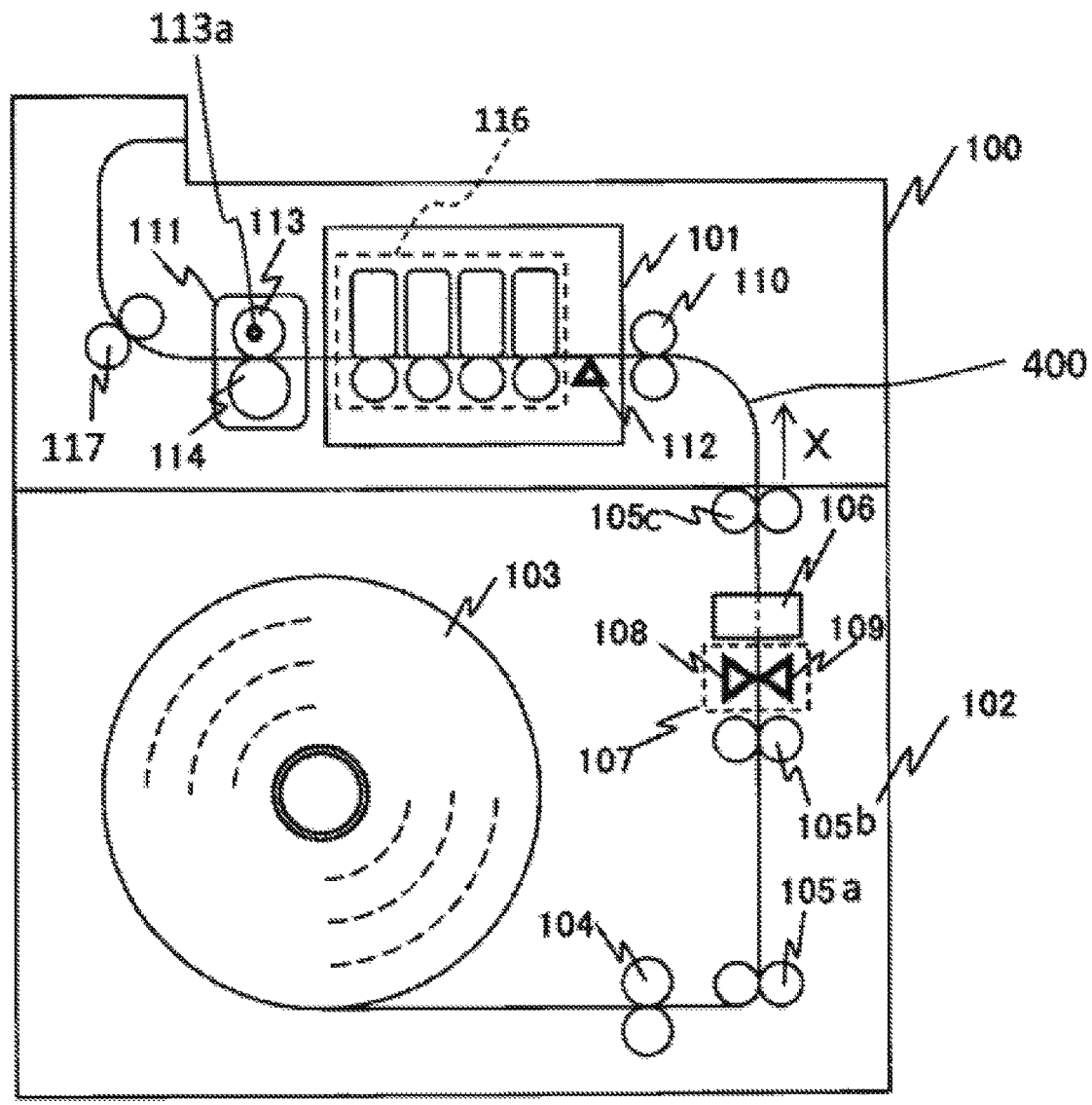
FIG. 2 is a schematic cross-sectional view of the image forming apparatus of the first embodiment.

FIG. 2 is a schematic cross-sectional view of an image forming apparatus 100 of the first embodiment.

The image forming apparatus 100 comprises an image forming part 101 and a feeder part 102. Also, disposed in the image forming part 101 is a fuser part 111.

The feeder part 102 accommodates a medium 103 as a long medium wound in a roll shape, and supplies it to the image forming part 101. The image forming part 101 forms toner images (developer images) of an image based on the image data and transfers them to a medium 103 supplied from the feeder part 102. The fuser part 111 performs a process of applying heat and a pressure to the medium 103 to which the toner images are transferred by the image forming part 101 (medium 103 with the toner images transferred) to fuse the toner images to the medium 103.

As shown in FIG. 2, inside the image forming apparatus 100, the medium 103 is carried along a medium carrying path 400. Hereafter, the direction along the medium carrying path 400 is also called the "medium carrying direction". Also, hereafter, the side toward which the medium 103 is carried in the medium carrying path 400 (the direction of an arrow X in FIG. 2) is called the "downstream side". Further, hereafter, the opposite direction to the direction toward which the medium 103 is carried in the medium carrying path 400 (the opposite direction of the arrow X in FIG. 2) is also called the "upstream side". Sequentially disposed on the medium carrying path 400 from the upstream side are carrying rollers 105a, 105b, and 105c, an image forming carrying roller 110, and ejection rollers 117. On the medium carrying path 400, the medium 103 is carried using the above-mentioned individual rollers. Configured in the image forming apparatus 100 is a carrying part that carries the medium 103 by the individual rollers on the medium carrying path 400 and motors that drive the individual rollers.

Also, hereafter, the size of the medium 103 in the medium carrying direction is called the "length", and the size of the medium 103 in a direction perpendicular to the medium carrying direction is called the "width".

Next, the configuration of the medium 103 is explained using FIGS. 3A through 3C.

As shown in FIGS. 3A through 3C, the medium 103 comprises a long base sheet 202 and labels 201 as multiple medium pieces that are temporarily attached to the long base sheet 202 with specified gaps. Also, hereafter, among the faces of the medium 103 and the base sheet 202, the face to which the labels 201 are temporarily attached is called the "front face", and the face to which the labels are not temporarily attached is called the "back face".

FIG. 3A is a side view of the medium 103. Also, FIG. 3B is a view from the front face of the medium 103 (plan view). Further, FIG. 3C is a view from the back side of the medium 103 (bottom view).

As shown in FIGS. 3A through 3C, the medium 103 comprises a long base sheet 202 and multiple pieces of label 201 that are temporarily attached to the long base sheet 202 with a specified gap from one another. Accommodated in the feeder part 102 is the long medium 103 shown in FIGS. 3A through 3C in a state wound in a roll shape.

In FIGS. 3A and 3B, the length of the labels 201 (hereafter, called "label length") is indicated as L1. Hereafter, regions between neighboring labels 201 in the medium carrying direction (portion of base sheet 202) are called gap parts 204. In FIGS. 3A through 3C, the length of each of the gap parts 204 (hereafter, called "gap length") is indicated as L2. In FIGS. 3A through 3C, the width of the labels 201 (hereafter, called "label width") is indicated as W1.

Also, as shown in FIG. 3C, placed on the back face of the base sheet 202 are black marks 203 as marks that can be used as positioning references in cutting or an image formation. The black marks 203 are band-shape marks printed in black solid color. In FIG. 3A the length of the black marks 203 (hereafter, called the "black mark length") is indicated as L3.

Besides, it is assumed that in the medium 103 shown in FIGS. 3A through 3C the gap length L2 and the black mark length L3 are the same length (L2=L3). Further, it is assumed in this embodiment that as shown in FIGS. 3A through 3C, the positions of the individual black marks 203 and the positions of the individual gap parts 204 are the same in the medium carrying direction.

Next, as shown in FIG. 2, the internal configuration of the feeder part 102 is explained.

In the feeder part 102, sequentially disposed from the upstream side along the medium carrying path 400 are a sheet feeding roller 104, a carrying roller 105a, a carrying roller 105b, a cutter-in-sensor 107, an auto cutter 106, and a carrying roller 105c.

The sheet feeding roller 104 is a roller that forwards the roll-shape medium 103 onto the medium carrying path 400.

The carrying rollers 105a, 105b, and 105c carry the roll-shape medium 103, that is forwarded by the sheet feeding roller 104 onto the medium carrying path 400, to the downstream side of the medium carrying path 400 (the direction of an arrow X in FIG. 2). In the feeder part 102, the medium 103 is carried (supplied) to the downstream side (side of image forming part 101) by the rotations of the sheet feeding roller 104 and the carrying rollers 105a, 105b, and 105c.

The auto cutter 106 as a cutting part cuts the medium 103.

The cutter-in-sensor 107 identifies (identifies the passage timings of) the labels 201 of the medium 103, the gap parts 204 of the base sheet 202, and the black marks 203 on the base sheet 202 that pass on the medium carrying path 400 in the upstream side of the auto cutter 106.

The cutter-in-sensor 107 comprises a transmission sensor 108 and a reflection sensor 109.

The transmission sensor 108 inspects light transmittance of the medium 103 that passes on the medium carrying path 400, and according to the inspection result (transmittance) identifies the positions of the labels 201 (regions of the base sheet 202 where the labels 201 are temporarily attached) and the positions of the gap parts 204 (regions of the base sheet 202 where the labels 201 are not temporarily attached). The transmission sensor 108 utilizes the difference in transmittance of its light to detect the positions of the labels 201 and the positions of the gap parts 204.

The reflection sensor 109 inspects light reflectance of the back face of the medium 103 (back face of the base sheet 202) that passes on the medium carrying path 400, and according to the inspection result (reflectance) identifies the positions where the black marks 203 are placed and the positions where the black marks 203 are not placed. The reflection sensor 109 utilizes the difference in its light reflectance to detect the positions where the black marks 203 are placed and the positions where the black marks 203 are not placed.

The auto cutter 106 cuts the medium 103 that passes on the medium carrying path 400 at timing according to the control by the below-mentioned control part 300. The medium 103 cut by the auto cutter 106 (a cut-off portion of the medium 103) is supplied to the image forming part 101 by the carrying roller 105c.

Figure 4A:
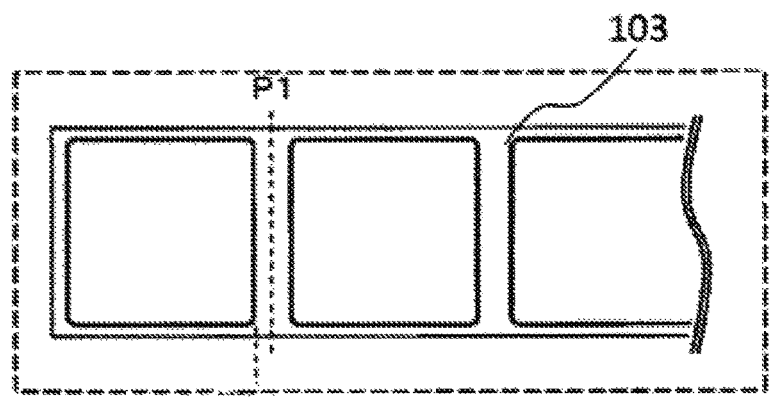
FIGS. 4A and 4B are explanatory diagrams showing a state where a medium used in the image forming apparatus of the first embodiment is cut.
Figure 4B:
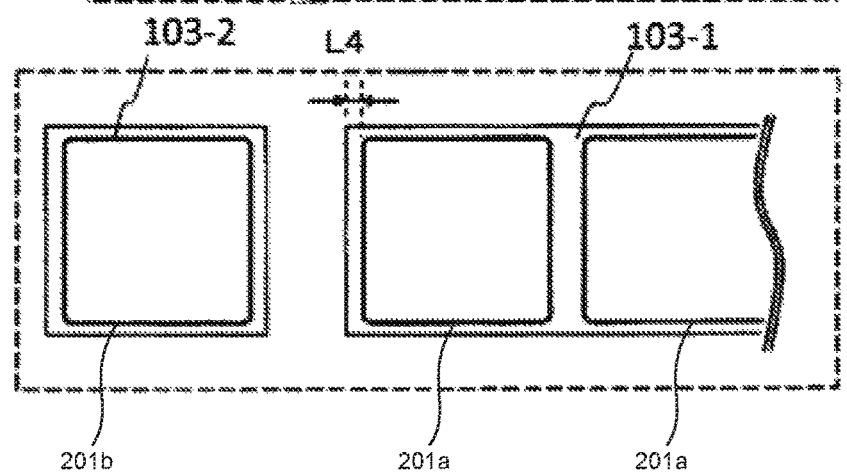

FIGS. 4A and 4B are explanatory diagrams showing a state where the medium 103 is cut by the auto cutter 106.

FIG. 4A is an exploratory diagram showing a state before the medium 103 is cut by the auto cutter 106. In FIG. 4A, the position (position in the medium carrying direction) cut by the auto cutter 106 is indicated as P1.

FIG. 4B is an explanatory diagram showing a state where a portion of the medium 103 is cut (cut in a direction perpendicular to the medium carrying direction) with a margin of length L4 and separated. In FIG. 4B, an upstream-side portion of the medium 103 after cut (the upstream side of the position P1) is indicated as medium 103-1 (hereinafter as upstream-side medium). Also, in FIG. 4B, a downstream-side portion of the medium 103 (a cut-off piece of the medium) after cut (the downstream side of the position P1) is indicated as medium 103-2 (hereinafter as downstream-side portion). Further, the label on the downstream-side medium is denoted with 201b, the labels on the upstream-side medium are denoted with 201a. As shown in FIG. 4B, the downstream-side medium 103-2 after cut includes only one label 201b. In practice, it may include more that two labels 201b.

In FIG. 4B, in the upstream-side medium 103-1, the size (hereafter called "base sheet leading edge length") from the leading edge of the base sheet 202 (position P1) to an edge of the label 201 (the downstream-side edge in the medium carrying direction) is indicated as L4. In the upstream-side medium 103-1 after cut, the base sheet leading edge length L4 varies according to the cut position P1, the gap length L2 and the thermal contraction characteristic of the medium when it is cut. In the embodiment, the cut position P1 (or initial cut position) is determined to be at a middle point between labels. When a gap distance between labels is input at a preparation operation, which is done before printing operation, the device determines where the middle point locates. The details are described later.

The medium 103 is ejected from the feeder part 102 by the carrying roller 105c. Then, the medium 103 ejected from the feeder part 102 is carried to the downstream side by the image forming carrying roller 110 and supplied to the image forming part 101.

As shown in FIG. 2, the image forming part 101 comprises a WR sensor 112 as a write sensor that detects the medium 103, and an image forming unit 116 that forms toner images based on image signals and transfers them to the medium 103. In the image forming part 101, once the medium 103 is detected by the WR sensor 112, the image forming unit 116 performs an image formation (transfers the toner images) to the medium 103. The image forming part 101 ejects the medium 103 with toner images formed to the downstream side. The medium 103 ejected from the image forming part 101 is supplied to the fuser part 111.

The fuser part 111 comprises a heat roller 113 and a pressure roller 114.

The heat roller 113 is a roller that is heated by a heater 113a. The pressure roller 114 is in contact with and pressed against the heat roller 113. The fuser part 111 nips the medium 103 between the pressure roller 114 and the heat roller 113 and carries it to the downstream side to perform a fusing process where heat and a pressure are applied to the medium 103. Thereby, the toner images of the medium 103 that passed through the fuser part 111 are fused.

The medium 103 ejected from the fuser part 111 is carried further to the downstream side by the ejection rollers 117 and ejected to the outside of the image forming apparatus 100.

Figure 1:
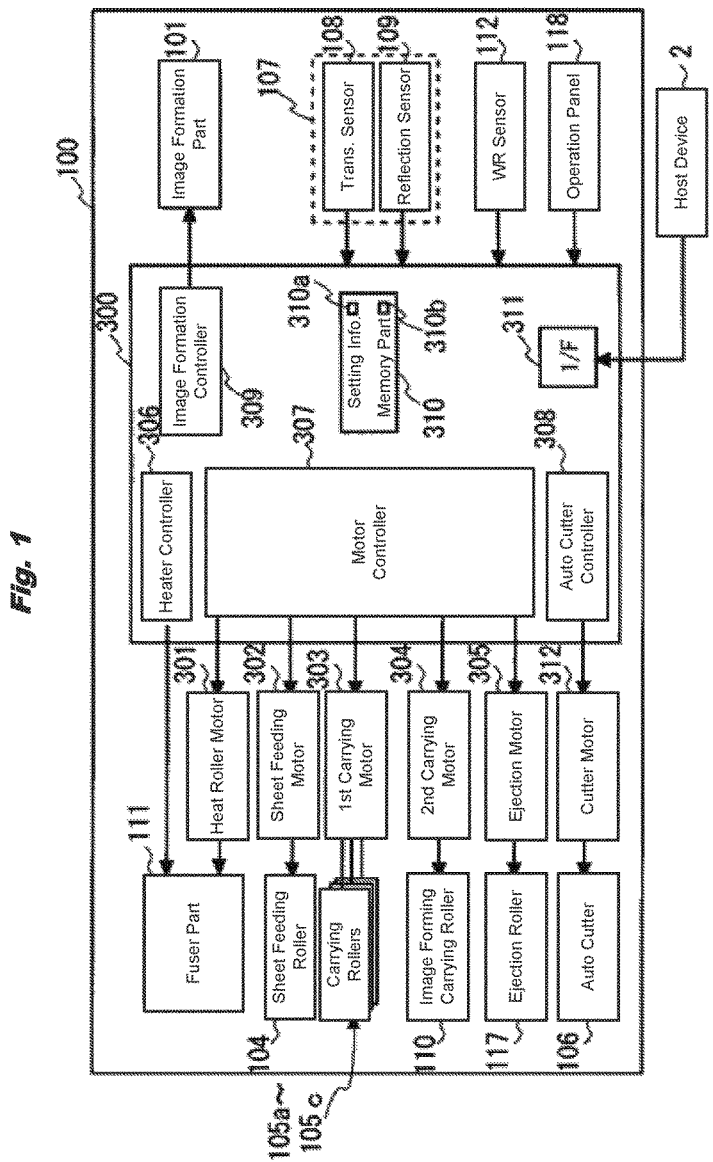
FIG. 1 is a block diagram showing the configuration of a control system of an image forming apparatus of the first embodiment.

Next, the configuration of a control system in the image forming apparatus 100 is explained using FIG. 1.

The image forming apparatus 100 comprises, as the components of its control system in addition to the components in FIG. 2 mentioned above, a control part 300, a heat roller motor 301, a sheet feeding motor 302, a first carrying motor 303, a second carrying motor 304, an ejection motor 305, a cutter motor 312, and an operation panel 118.

The heat roller motor 301 is a motor for rotationally driving the heat roller 113 of the fuser part 111. The sheet feeding motor 302 is a motor for rotationally driving the sheet feeding roller 104. The first carrying motor 303 is a motor for rotationally driving the carrying rollers 105a through 105c. The second carrying motor 304 is a motor for rotationally driving the image forming carrying roller 110. The ejection motor 305 is a motor for rotationally driving the ejection rollers 117. The cutter motor 312 is a motor (drive source) for driving the auto cuter 106 to cut the medium 103.

The control part 300 performs the whole control of the image forming apparatus 100. The control part 300 may be configured, for example, by installing various kinds of programs (image forming programs relating to embodiments) on a computer comprising processors and memory. Also, part or the whole of the control part 300 may be constructed using hardware (for example, dedicated semiconductor chips or the like). The control part 300 functionally comprises, as shown in FIG. 1, a heater controller 306, a motor controller 307, an auto cutter controller 308, an image formation controller 309, a setting information memory part 310, and an I/F 311.

The heater controller 306 controls the heater 113a of the fuser part 111 to control the temperature of the heat roller 113.

The motor controller 307 performs drive controls of the individual motors (the heat roller motor 301, the sheet feeding motor 302, the first carrying motor 303, the second carrying motor 304, and the ejection motor 305) of the individual rollers. The motor controller 307 controls the individual motors to carry the medium 103, and uses the cutter-in-sensor 107 and the WR sensor 112 to monitor the carrying state of the medium 103. The motor controller 307 starts carrying the medium 103 after the temperature of the heat roller 113 reached an appropriate value.

The auto cutter controller 308 as a cut position determining part performs a drive control of the auto cuter 106 (cutter motor 312). The auto cutter controller 308 monitors the detection results of the cutter-in-sensor 107, and at the timing when the medium 103 has reached a preset cut position, drives the cutter motor 312 to cut the medium 103 with the auto cuter 106. This preset cut position is regarded as the initial cut position previously discussed, which is determined at a middle point between labels. Specifically, the auto cutter controller 308, based on the detection value of the cutter-in-sensor 107, detects one of the gap parts 204 of the base sheet 202 or one of the black marks 203. Afterwards, at the timing when the preset cut position has reached the auto cuter 106, the auto cutter controller 308 drives the cutter motor 312 to cut the medium 103.

The image formation controller 309 mainly performs the control of an image forming process by the image forming part 101. The image formation controller 309 receives print data through the I/F 311 from a host device 2, and converts the received print data into image data (data corresponding to the print process in the image forming part 101). Once the WR sensor 112 detects the medium 103, the image formation controller 309 transfers the image data to the image forming part 101. Then, the image formation controller 309 controls the image forming part 101 to have toner images formed on the medium 103.

The operation panel 118 carries a function of user interface that accepts operations by a user and outputs information. The operation panel 118 can be configured, for example, using a display, hard buttons, etc. that are now shown.

The I/F 311 is an interface for connecting to (communicating with) the external host device 2.

The setting information memory part 310 is a memory part that stores setting information (parameters) used in controlling individual parts inside the control part 300. The setting information memory part 310 in this embodiment stores, at least, medium setting information 310a and medium type information 310b.

The medium setting information 310a is information on the medium 103 (medium 103 contained by the feeder part 102) used in the image forming apparatus 100. Included as the medium setting information 310a, for example, is information on the type and size (individual dimensions) of the medium 103.

In this embodiment, explanations are given assuming that the contents of the medium setting information 310a are such as those shown in FIG. 5.

As shown in FIG. 5, in the medium setting information 310a of this embodiment, it is assumed that as the information on the size of the medium 103, items of the label length, the label width, the gap length, and the cut position are registered. It is assumed that the cut position item in the medium setting information 310a is given in terms of the base sheet leading edge length (L4) when the medium 103 is cut.

Also, in FIG. 5, information on the type (material) of the medium 103 is also registered in the medium setting information 310a. In the medium setting information 310a shown in FIG. 5, synthetic paper is set as the type (material) of the medium 103.

FIG. 6 is an explanatory table showing a configuration example of the medium type information 310b.

Registered in the medium type information 310b by the types of medium 103 supported by the image forming apparatus 100 are the reference values of the cut positions according to the characteristics (thermal contraction characteristics) of the media.

Registered in the medium type information 310b shown in FIG. 6 for each type of the media, are items of "Thermal Contraction" indicating the thermal contraction characteristic (degree of thermal contraction) of the medium, and "Reference Value" indicating the cut position (base sheet leading edge length) that takes the thermal contraction characteristic of the medium into account.

The reference value may be the cut position L4 where, even though the thermal contraction occurs on the medium, a label is not peeled off and a normal carriage is performed. For example, in a case where 0.5 mm margin at a leading edge of the base sheet with respect to a label is required in order to securely carry the sheet without the label peeling off, the reference value for PET (a type of the sheet) is set to be 1.3 mm. The amount of 1.3 mm is determined by considering three factors below:

1) 0.5 mm reference value above
2) variation amount at cutting by the autocutter
3) contraction amount of the sheet that occurs at the fuser.

Given that the variation amount at cutting is 0.5 mm and the thermal contraction is 0.3 mm, the total amount becomes 1.3 mm. The above reference value is determined this way.

Registered in the "Medium Type" item is the name of each type of the medium. Registered in FIG. 5 is information on plain paper, PET, urethane, and synthetic paper.

The "Thermal Contraction" item indicates the degree of thermal contraction when the medium is heated in the fuser part 111. In this embodiment, explanations are given assuming that either "Large" requiring a change in the cut position or "Small" requiring no change in the cut position is set in the thermal contraction item. In FIG. 6, only the thermal contraction entry for plain paper is set to "Small", and the thermal contraction entries for the other types of media (PET, urethane, and synthetic paper) are set to "Large".

Registered in the "Reference Value" item for the media whose thermal contraction values are "Large" are reference values of the cut positions (base sheet leading edge length) that become necessary taking the thermal contraction characteristics of the media into account. In FIG. 6, reference values are set for PET, urethane, and synthetic paper whose thermal contraction items become "Large". In the medium type information 310b, the larger the degree of thermal contraction that a medium type has is, the larger the reference value (reference base sheet leading edge length) is set.

As shown in FIG. 1, in the control part 300, there are no limitations on the method of setting data to the setting information memory part 310 (the medium setting information 310a and the medium type information 310b). For example, the control part 300 may accept changes to the content of the setting information memory part 310 according to an operation from a user (operation to the operation panel 118). Also, for example, the control part 300 may accept changes to the content of the setting information memory part 310 by accepting an instruction from an external device (for example, the host device 2) through communication.

(A-2) Operations of the First Embodiment

Next, the operations of the image forming apparatus 100 of the first embodiment having such a configuration as mentioned above are explained.

Figure 7:
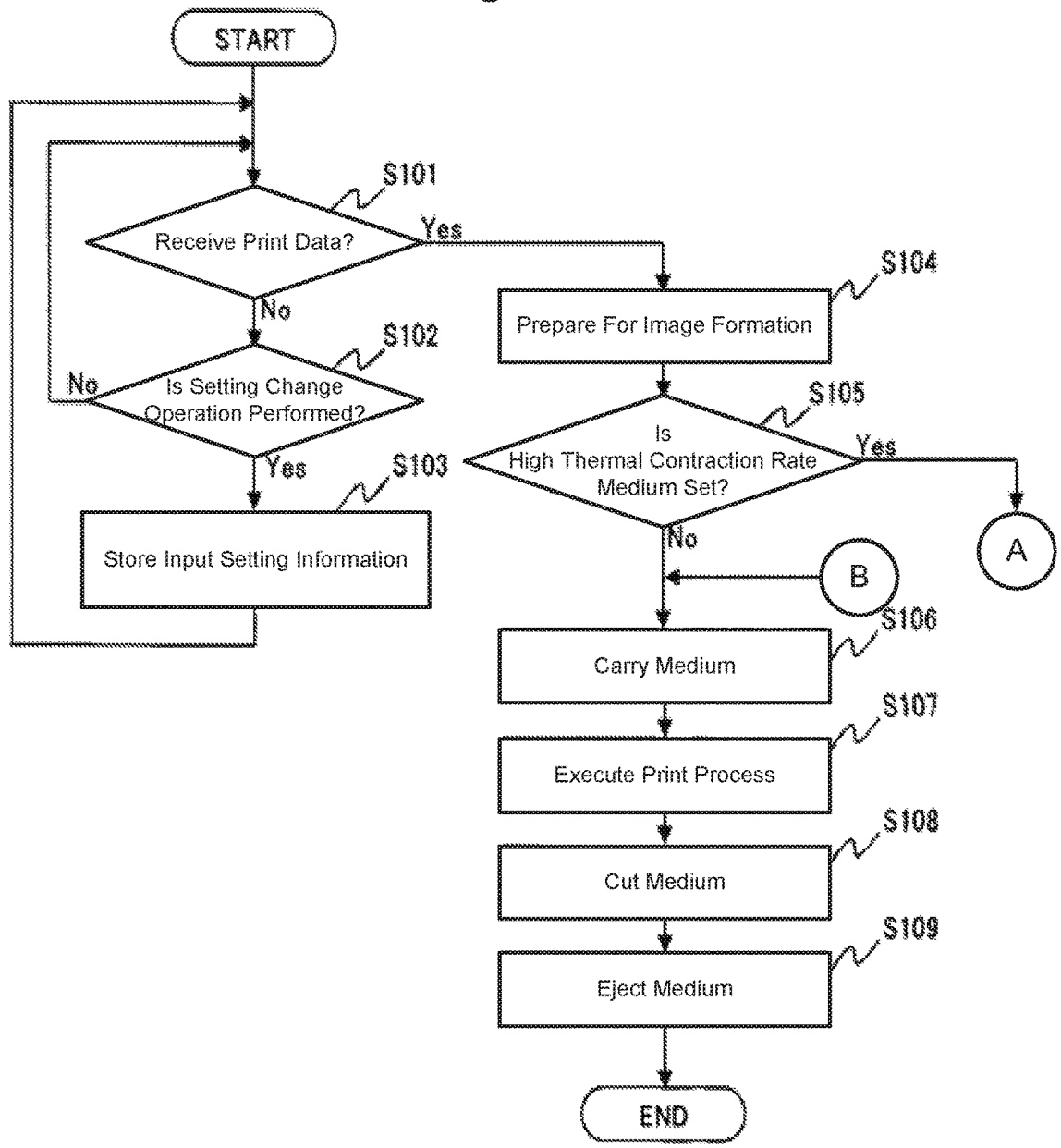
FIG. 7 is a flow chart (Part 1) showing the operations of the image forming apparatus of the first embodiment.
Figure 8:
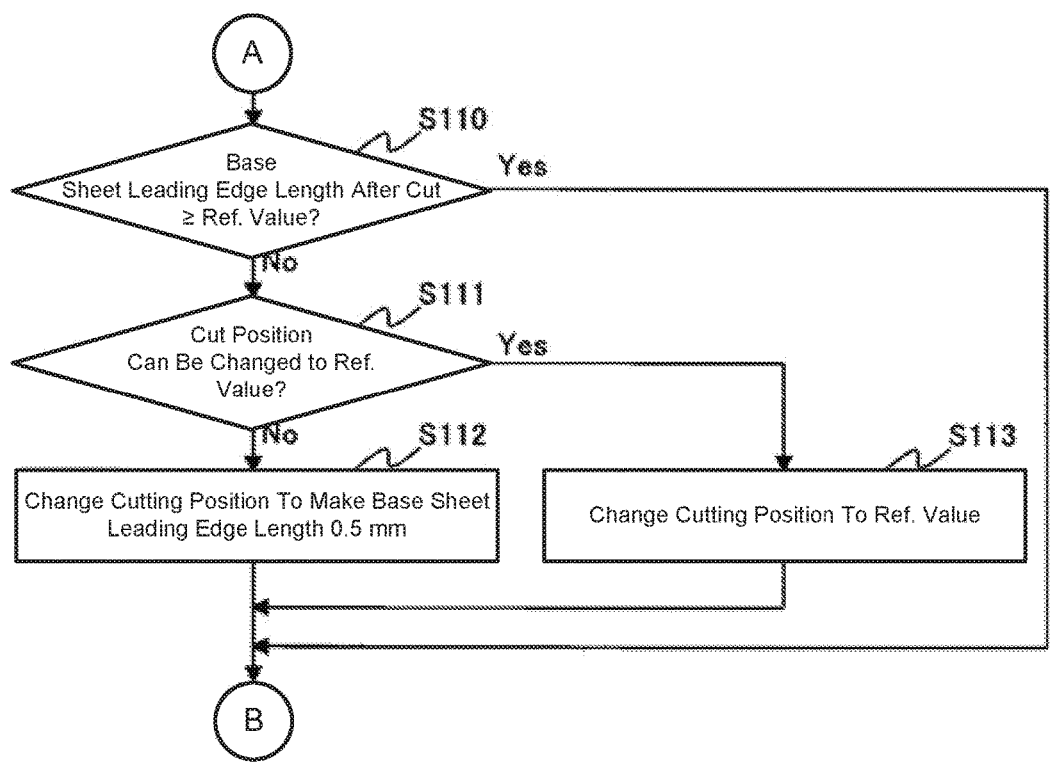
FIG. 8 is a flow chart (Part 2) showing the operations of the image forming apparatus of the first embodiment.

FIGS. 7 and 8 are flow charts showing the operations of the image forming apparatus 100 (the control part 300).

Upon accepting a setting change operation (operation to the operation panel 118) from a user while standing by, the control part 300 stores setting information corresponding to that operation (S102 and S103). For example, the control part 300 may accept information to be registered to the medium setting information 310a of the setting information memory part 310 by the user's operation.

Also, upon receiving print data from the host device 2 while standing by, the control part 300 performs a preparation for an image formation (for example, a process of creating image data for the image formation controller 309 to perform printing based on the print data, etc.) (S101 and S104), and performs an image formation in the operations in S105 mentioned below and thereafter.

Once an image formation is started, the control part 300 (auto cutter controller 308) refers to the medium type information 310b to check whether the type of the medium 103 set in the medium setting information 310a is a type of medium having a high thermal contraction rate or not (whether the thermal contraction item is large or not) (S105).

If it determined that the medium 103 set in the medium setting information 310a is a medium having a high thermal contraction rate (if the thermal contraction item is large), the control part 300 moves to a process in S110 mentioned below, and if it is determined that the medium 103 set in the medium setting information 310a is not a medium having a high thermal contraction rate (if the thermal contraction item is small), moves to S106 mentioned below.

If it is determined in the above-mentioned S105 that the type of the medium 103 set in the medium setting information 310a is a type of medium having a high thermal contraction rate, the control part 300 (auto cutter controller 308) checks whether the cut position (the base sheet leading edge length when the medium 103 is cut) set in the medium setting information 310a is equal to or greater than the reference value set in the medium type information 310b (the reference value corresponding to the medium type set in the medium setting information 310a) or not (S110).

If the set cut position (base sheet leading edge length) is equal to or greater than the reference value, the control part 300 moves to a process in S106 mentioned below, and if not, operates from S111 mentioned below.

If it is determined in the above-mentioned S110 that the set cut position (base sheet leading edge length) is shorter than the reference value, the control part 300 (auto cutter controller 308) determines whether the cut position can be changed to the reference value or not (S111). If the set cut position (base sheet leading edge length) is equal to or greater than the reference value, the control part 300 (auto cutter controller 308) operates from S113 mentioned below, and if not, operates from S112 mentioned below. For example, if the gap length set in the medium setting information 310a is greater than the reference value, the control part 300 (auto cutter controller 308) determines that the cut position can be changed to the reference value, and if not, determines that the cut position cannot be changed to the reference value.

Then, if it is determined in the above-mentioned S111 that the cut position can be changed to the reference value, the control part 300 (auto cutter controller 308) changes the cut position in cutting the medium 103 to the reference value (S113) and moves to S106 mentioned below.

On the other hand, if it is determined in the above-mentioned S111 that the cut position cannot be changed to the reference value, the control part 300 (auto cutter controller 308) changes the cut position to a predetermined position (for example, a cut position that makes the base sheet leading edge length about 0.5 mm) (S112) and moves to S106 mentioned below. The specified cut position (0.5 mm) in S112 is an example, and it is determined by the cut position accuracy of the image forming apparatus 100. If the image forming apparatus 100 has high cutting accuracy, it becomes possible to shorten the base sheet leading edge length of the above-mentioned specified cut position and secure the base sheet leading edge length after cut. The above cut position (0.5 mm) is determined by considering a secure carriage or thermal contraction etc.

Upon completing the cut position setting of the medium 103, the control part 300 utilizes the motor controller 307 to drive control the individual rollers and start carrying the medium 103 (S106).

Next, the control part 300 (image formation controller 309) controls the image forming unit 116 to execute an image forming process (print process) to the medium 103 (S107).

Next, the control part 300 (auto cutter controller 308) cuts the medium 103 at the set cut position (if the cut position was changed in the above-mentioned S110 through S113, the cut position after that change) (S108).

Next, the control part 300 (motor controller 307) rotationally drives the ejection rollers 117 to eject the medium 103 in the downstream side after being cut to the outside (S109).

(A-3) Efficacy of the First Embodiment

According to the first embodiment, the following efficacy can be achieved.

The image forming apparatus 100 (control part 300) of the first embodiment changes the cut position of the medium 103 (the base sheet leading edge length after cut) according to the configuration of the medium 103 (for example, the thermal contraction of the material of the medium 103). Thereby, in the image forming apparatus 100 of the first embodiment, even if the medium 103 is configured using a material having a large thermal contraction, the medium 103 is cut at a cut position (base sheet leading edge length) that took the thermal contraction (thermal contraction by the fusing process) into account in advance. Specifically, the image forming apparatus 100 determines whether the base sheet leading edge length set in the medium setting information 310a in advance has no problem even if thermal contraction while passing through the fuser part 111 is taken into account. Then, if it is determined that the base sheet leading edge length after cut is shorter than the preset reference value due to thermal contraction, the image forming apparatus 100 automatically changes the cut position (changes the cut position to the downstream side). Thereby, the image forming apparatus 100 of the first embodiment can suppress the occurrences of abnormal carriage of the medium 103 (for example, jamming caused by the labels 201 peeling off, etc.) caused by the fact that the base sheet leading edge length after cut is short.

(B) Second Embodiment

Below, the second embodiment of an image forming apparatus and an image forming apparatus control method according to this invention is explained in detail referring to drawings.

(B-1) Configuration of the Second Embodiment

Figure 9:
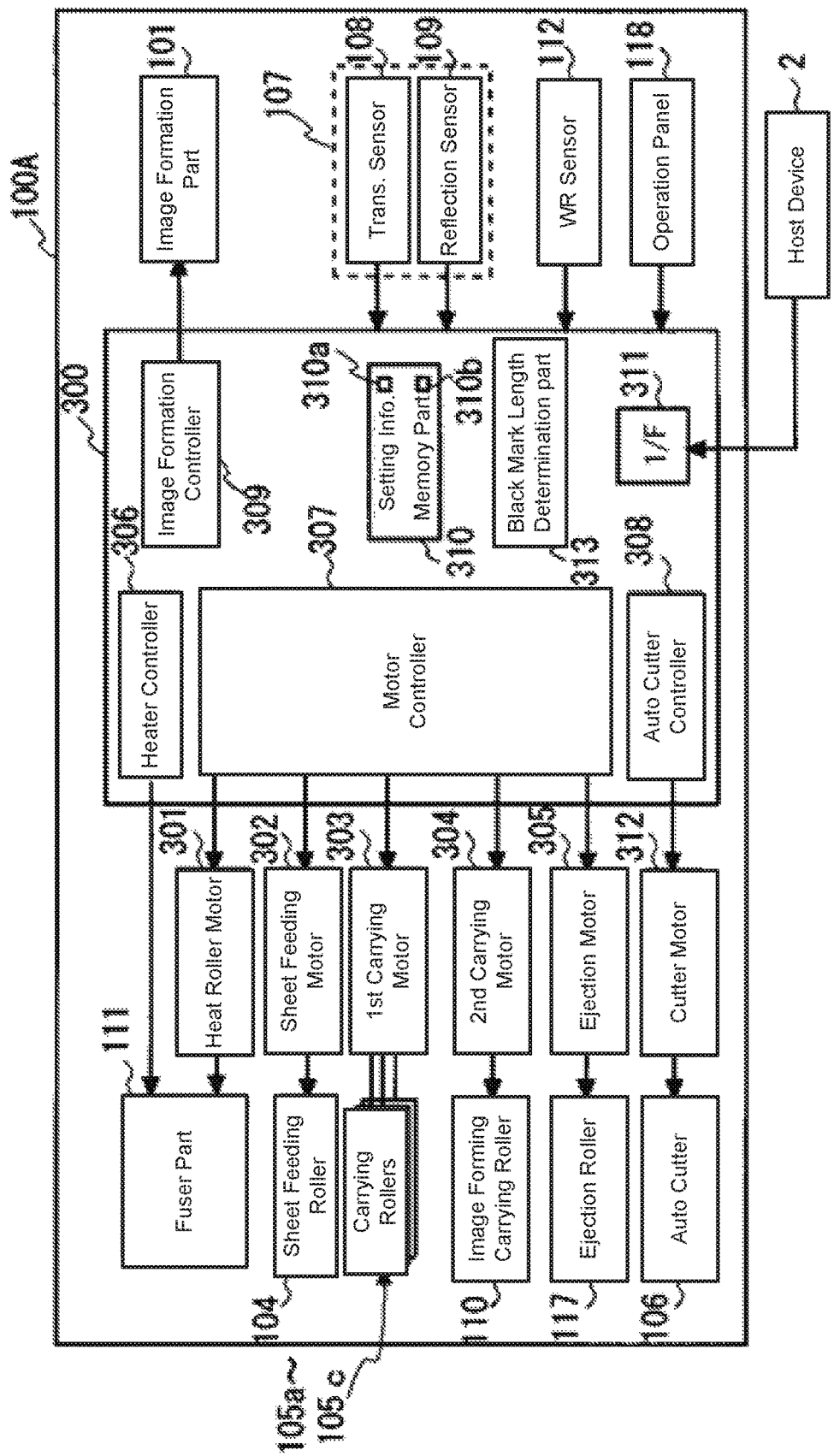
FIG. 9 is a block diagram showing the configuration of a control system of an image forming apparatus of the second embodiment.

FIG. 9 is a block diagram showing the whole configuration of an image forming apparatus 100A of this embodiment, where the identical or corresponding parts to those in the above-mentioned FIG. 1 are given the identical or corresponding codes. The hardware configuration of the image forming apparatus 100A of the second embodiment can also be shown in the above-mentioned FIG. 2. Below, differences of the second embodiment from the first embodiment are explained.

The image forming apparatus 100A of the second embodiment is different from that of the first embodiment in that a black mark length determination part 313 is added to the control part 300.

In the first embodiment, although the occurrences of peeling or jamming of the labels 201 are suppressed by changing (offsetting) the base sheet leading edge length after cut the medium 103 according to the type of the medium 103, the influences when the region of the black mark 203 is cut is not taken into account. For example, if the base sheet 202 is made of a material having low transmittance or the labels 201 are made of a transparent material (that is, in a case where the base sheet 202 part and the labels 201 part have little difference in transmittance), it becomes difficult for the transmission sensor 108 to detect the labels 201. When using the medium 103 of such a type (material) as mentioned above, the one having the black marks 203 preprinted on the base sheet 202 needs to be used. For example, in the medium 103, if the black marks 203 are disposed between the labels 201 (in the gap parts 204), the auto cutter controller 308 would cut the central part of each of the black marks 203. However, in this case, by cutting the black marks 203, they become shorter than the original black mark length L3. Especially, if the black mark length becomes too short in the medium 103 after cut, the black marks 203 after cut may not be detected by the individual sensors on the medium carrying path 400 (individual sensors that optically detect the medium 103) or the detection errors may become large. In this case, in the image forming apparatus 100, problems such as shifting of the print start position may occur.

Then, in the second embodiment, the black mark length judging part 313 grasps the length of the black marks 203 (black mark length) based on the detection state of the reflection sensor 109 that detects the black marks 203. The black mark length determination part 313 obtains the length of the black marks 203 (black mark length) based on the medium carrying distance from the state where the reflection sensor 109 detected a black mark 203 to the state of non-detection for example. Then, the black mark length determination part 312 calculates the black mark length after cut at the set cut position for the obtained black mark length and determines whether any cut position change (offset) is required.

Then, if it is determined that the black mark length after cut the medium 103 will become shorter than the preset reference value, the auto cutter controller 308 determines to change (offset) the cut position so that the black mark length after cut will become longer.

When cutting the medium 103, the auto cutter controller 308 of the second embodiment determines the cut position with the black marks 203 as the reference. In the example of the second embodiment, explanations are given assuming that the auto cutter controller 308 determines the central position of each of the black marks (central position in the medium carrying direction) as the cut position as the default setting.

FIGS. 10A and 10B are explanatory diagrams showing the state of black marks 203 (black mark length) after the medium 103 is cut by the auto cutter 106.

In FIGS. 10A and 10B the black mark length before cutting the medium 103 is indicated as L3, and the black mark length in the upstream-side edge after cut the medium 103 (the edge of the upstream-side medium 103) as L5. Also, in FIGS. 10A and 10B, the central position (central position in the medium carrying direction) of the black marks 203 is indicated as P2.

Shown in FIG. 10A is an example case where the black mark length L3 before cutting coincides with the gap length L2. Also, shown in FIG. 10B is an example case where the black mark length L3 before cutting is shorter than the gap length L2 (case where the black mark length L3 before cutting is shorter than in the case of FIG. 10A).

In the example of FIG. 10A, the medium 103 is cut at the central position P2 of one of the black marks 203. That is, shown in FIG. 10A is an example where the auto cutter controller 308 did not change (offset) the cut position.

In the example of FIG. 10B, because the black mark length L3 before cutting is short (thin), shown is an example where instead of the central position P2 of one of the black marks 203, the cut position was changed to a position P3 that is in the downstream side of the position P2. That is, shown in FIG. 10B is an example where the auto cutter controller 308 changed (offset) the cut position.

Although there are no limitations on the method of setting the reference value for the black mark length to the black mark length determination part 313, in this embodiment, explanations are given assuming that it is set in the medium setting information 310a.

FIG. 11 is an explanatory diagram showing the content of the medium setting information 310a of the second embodiment.

The medium setting information 310a of the second embodiment is different from that of the first embodiment in that the item of the black mark length reference value is additionally set as shown in FIG. 11.

The black mark length reference values set in the medium setting information 310a may be set, for example, according to the positioning performance using the WR sensor 112 in the image forming part 101. For example, in the image forming part 101, if the black mark length that is minimally required when performing a positioning using the WR sensor 112 is known, a value longer than that black mark length may be set in the medium setting information 310a (set by a user's operation).

Also, it is assumed that in the medium setting information 310a of the second embodiment, the central position of the black marks 203 is set as the cut position item.

Also, it is assumed that in the medium setting information 310a of the second embodiment, PET is set as the medium type. If the material of the medium 103 is transparent PET, the position of the medium 103 cannot be detected (for example, detection of the gap part 204) using the transmission sensor 108. If PET is set as the medium type, the image forming apparatus 100A may determine the cut position by detecting the black marks 203 using the reflection sensor 109.

Besides, although explanations in the image forming apparatus 100A of the second embodiment are given assuming the use of the reflection sensor 109 as a sensor when judging the cut position of the medium, the sensor used may be made switchable according to the setting or user's operation. Besides, if the transmission sensor 108 is applied as a sensor to determine the cut position of the medium in the image forming apparatus 100A, the content of the medium setting information 310a may be replaced with the content for the transmission sensor 108 (for example, the above-mentioned content of FIG. 5), and similar operations to the first embodiment may be performed. Also, in the image forming apparatus 100A of the second embodiment, for example, the sensor to determine the cut position of the medium 103 may be switched according to the type of the medium 103.

(B-2) Operations of the Second Embodiment

Below, the operations of the image forming apparatus 100A (control part 300) of the second embodiment are explained centering on the differences from those of the first embodiment.

Figure 12:
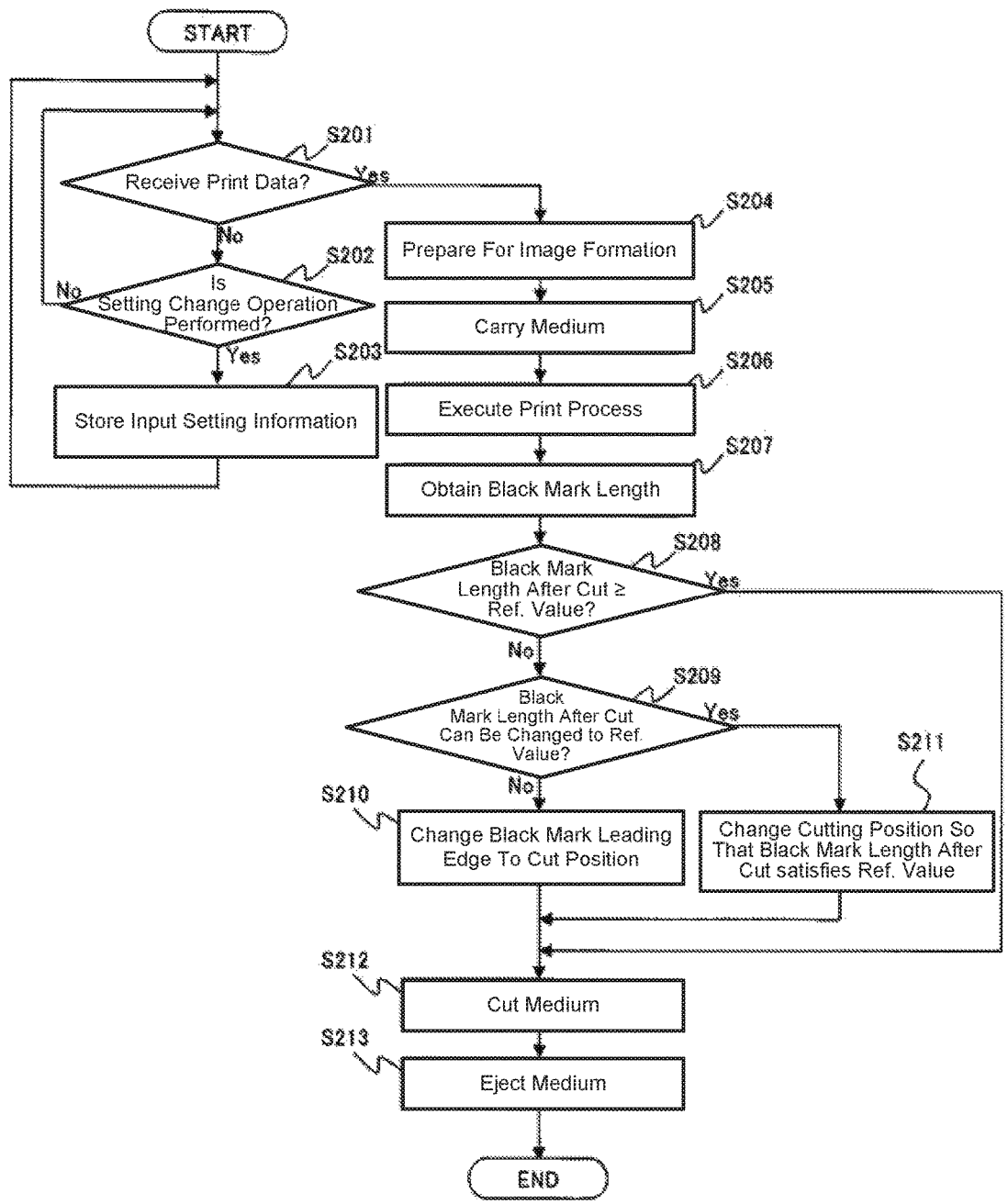
FIG. 12 is a flow chart showing the operations of the image forming apparatus of the second embodiment.

FIG. 12 is a flow chart showing the operations of the image forming apparatus 100A (control part 300) of the second embodiment.

Because the operations (operations S201 through S204) until the image forming apparatus 100A (control part 300) preforms an image formation preparation process are the same as in the first embodiment (the above-mentioned S101 through S104), their detailed explanations are omitted.

Then, once the image formation preparation process is complete, the control part 300 (motor controller 307) drive controls the individual rollers to start carrying the medium 103 (S205).

Next, the control part 300 (image-formation controller 309) controls the image forming unit 116 to have it execute a print process to the medium 103 (S206).

While the medium 103 is being carried, the control part 300 (black mark length determination part 313) detects black marks 203 using the cutter-in-sensor 107 (reflection sensor 109) and also performs a process to obtain the black mark length (S207).

After obtaining the black mark length, the control part 300 (auto cutter controller 308) determines whether the black mark length L5 after cut becomes equal to or greater than the reference value (the black mark length reference value set in the medium setting information 310a) based on the obtained black mark length and the set values of the cut position (S208). If the black mark length L5 after cut is shorter than the black mark length reference value, the control part 300 operates from S209 mentioned below, and if the black mark length after cut is equal to or greater than the black mark length reference value, operates from S212 mentioned below.

Assumed here is, as shown in FIG. 11, a case where the setting (default setting) that the medium 103 is cut at the central position of the black marks 203 (central position in the medium carrying direction) is made in the auto cutter controller 308. In this case, the black mark length determination part 313 recognizes the dimension that is one half of the obtained black mark length as the black mark length after cut, and performs a process to compare it with the black mark length reference value. For example, if the obtained black mark length is denoted as the black mark length L3, the black mark length L5 after cut becomes L3/2.Therefore, the black mark length determination part 313 would perform a process to compare L3/2 with the black mark length reference value.

If it is determined in the above-mentioned S208 that the black mark length after cut is shorter than the black mark length reference value, the control part 300 (auto cutter controller 308) determines whether cutting at a cut position satisfying the black mark length reference value is possible (S209)

In this case, the maximum value of the black mark length that can be secured after cut becomes the black mark length obtained in the above-mentioned S207 by the black mark length determination part 313. Therefore, if the obtained black mark length is equal to or greater than the black mark length reference value, the auto cutter controller 308 determines that cutting at a cut position satisfying the black mark length reference value is possible.

If it is determined in the above-mentioned S209 that cutting at a cut position satisfying the black mark length reference value is not possible, the auto cutter controller 308 changes the cut position to a position in the downstream-side leading edge of the black marks 203 (S210). The maximum value of the black mark length securable after cut is the black mark length obtained in the above-mentioned S207 by the black mark length determination part 313. Therefore, in this case, the auto cutter controller 308 can extend the black mark length after cut as much as possible by setting the cut position to the position of the downstream-side leading edge of the black marks 203.

On the other hand, if it is determined in the above-mentioned S209 that cutting at a cut position satisfying the black mark length reference value is possible, the auto cutter controller 308 changes the cut position so that the black mark length after cut satisfies the black mark length reference value (S211).

Afterwards, if the control part 300 (auto cutter controller 308) cuts the medium 103 at the set cut position (if the cut position is changed in the above-mentioned S209 through S211, the cut position after the change) (S212).

Next, the control part 300 (motor controller 307) ejects the downstream-side medium 103 after being cut to the outside (S213).

(B-3) Efficacy of the Second Embodiment

According to the second embodiment, the following efficacy can be achieved.

In the image forming apparatus 100A of the second embodiment, if it is determined that the black mark length after cut the medium 103A will become shorter than the preset reference value (the black mark length set in the medium setting information 310a), the cut position is changed (the cut position is changed to the downstream side). Thereby, in the image forming apparatus 100A of the second embodiment, detection failures of the medium 103, positioning shifts of the print start position, etc. caused by the fact that black mark length is short can be suppressed.

(C) Other Embodiments

This invention is not limited to the above-mentioned embodiments, but modification embodiments as illustrated below can also be listed.

(C-1) Although explained in the above-mentioned embodiments were examples of applying the image forming apparatus of this invention to a printer, the image forming apparatus of this invention can be applied to other kinds of image forming apparatuses (for example, multifunction machines supporting other functions than the printer function, etc.).

(C-2) Although the reflection sensor 109 is built in the cutter-in-sensor 107 in the first embodiment, if there is no need to perform a position determination using the black marks 203, it may be omitted. Also, the medium 103 used in the first embodiment may have a configuration omitting the black marks 203.

In the same manner, although the transmission sensor 108 is built in the cutter-in-sensor 107 in the second embodiment, if the positions of the medium 103 are detected using only the black marks 203, the transmission sensor 108 may be omitted. Also, in the second embodiment, the medium type information 310b may be omitted.

(Thermal Contraction)

In the invention, the thermal contraction in general can be determined by data provided by manufactures. The data may be based on regulations of each of the manufacturers or may be based on ISO 11501 (Plastics—Film and sheeting—Determination of dimensional change on heating). Considering a fact that thermal amount applied to a medium from a fuser of printer does not necessarily match a measurement standard of the thermal contraction, the determination whether or not the thermal contraction is large or small may be adjusted for each machine. In the invention, a large thermal contraction means that the degree of the thermal contraction is so large that it needs to be considered in a design process. On the other hand, a small thermal contraction means that the degree is so small that it can be omitted from the design considerations.

(Reference Value)

The reference value means a value for securing a leading edge base sheet length that allows to securely carrying the sheet without jamming even if a possibility of thermal contraction is counted. The value may be determined considering various factors, such as a thermal construction, a margin at the leading edge of medium in order not to allow the adhesive portion of the label to stick out (or protrude).

In the invention, other contraction, such as due to moisture, other than the thermal contraction can be taken into consideration to adjust the reference value.

What is claimed is:

1. An image forming apparatus, comprising:
an image forming part that performs an image formation on each of individual medium pieces that are attached to a long base sheet with specified gaps wherein a long medium is configured with the long base sheet and the medium pieces,
a carrying part that carries the long medium to the image forming part in a medium carrying direction,
a cutting part that cuts the long medium that is being carried by the carrying part at a cut position in a gap between adjacent medium pieces, and
a cut position determining part that determines the cut position in a gap between a pair of adjacent medium pieces, wherein
the cut position determining part changes a current cut position in a gap between a current pair of adjacent medium pieces according to a leading edge length, and
the leading edge length is defined as a length between a leading edge of the long medium and a leading edge of a downstream-side medium piece of the long medium positioned adjacent to a previous cut position after cutting the long medium at the previous cut position.

2. The image forming apparatus according to claim 1, wherein
the cut position determining part determines whether or not a change of the current cut position in the gap between the current pair of adjacent medium pieces, which is originally set to be a present cut position, is required according to the leading edge length, and
if it is determined that the change of the current cut position in the gap between the current pair of adjacent medium pieces is required, the cut position determining part changes the current cut position to a new cut position, which is another cut position other than the current cut position, according to a configuration of the long medium in addition to the leading edge length.

3. The image forming apparatus according to claim 2, wherein
the configuration of the long medium is a type of the long medium, and
the image forming apparatus further comprises a fuser at a downstream side from the cutting part in the medium carrying direction.

4. The image forming apparatus according to claim 3, wherein
when the leading edge length becomes shorter than a reference length according to the configuration of the long medium, the cut position determining part determines to cut the long medium at the new cut position.

5. The image forming apparatus according to claim 3, wherein
the cut position determining part determines whether or not the change of the current cut position is required according to a thermal contraction characteristics of the long medium.

6. The image forming apparatus according to claim 4, wherein
if the leading edge length becomes shorter than the reference length, the cut position determining part determines to cut the long medium at a cut position that makes the leading edge length equal to or greater than the reference length as the second cut position.

7. The image forming apparatus according to claim 6, wherein
if the leading edge length is shorter than the reference length, the cut position determining part determines to cut the long medium at a cut position that makes the base sheet leading edge length a predetermined length as the new cut position.

8. The image forming apparatus according to claim 4, wherein
the reference length is a length calculated according to the thermal contraction characteristics of the long medium.

9. An image forming apparatus, comprising:
an image forming part that performs an image formation on each of individual medium pieces that are attached to a long base sheet with specified gaps between neighboring medium pieces wherein a long medium is configured with the long base sheet and the medium pieces,
a carrying part that carries the long medium to the image forming part in a medium carrying direction,
a cutting part that cuts the long medium that is being carried by the carrying part at a cut position in a gap between adjacent medium pieces, and
a cut position determining part that determines the cut position in a gap between the adjacent medium pieces where the long medium is cut by the cutting part, wherein
the cut position determining part determines whether or not a change of a current cut position, which is originally set to be a preset cut position, in a current gap is required according to a mark length of a mark for positioning in a previous gap,
if it is determined that the change of the current cut position is required, the cut position determining part changes the current cut position to a new cut position, which is another cut position other than the current cut position,
the mark for positioning is provided on each gap between the neighboring medium pieces on the base sheet of the long medium,
the mark length is a length of the mark for positioning between a leading edge of the long medium and a leading edge of the medium piece on the long medium adjacent to the previous cut position after cutting the long medium at the previous cut position,
if the mark length after cutting the long medium at the previous cut position becomes shorter than a specified reference length, the cut position determining part determines to cut the long medium at the new cut position.

10. The image forming apparatus according to claim 9, wherein
if the mark length after cutting the long medium at the current cut position becomes shorter than the reference length, the cut position determining part determines to cut the long medium at a cut position that makes the mark length equal to or greater than the reference length as the new cut position.

11. The image forming apparatus according to claim 10, wherein
if the mark length after cut the long medium is shorter than the reference length, the cut position determining part determines to cut the long medium at a cut position that makes the mark length the maximum for the configuration of the long medium as the new cut position.

12. The image forming apparatus according to claim 9, wherein
the image forming part is provided with a write sensor that detects the mark of the long medium, and
the image forming part performs a positioning of an image forming position using the write sensor.

13. An image forming apparatus control method that are performed with an image forming part, a carrying part, a cutting part, and a cut position determining part, comprising:
by the image forming part, performing an image formation on each of individual medium pieces that are attached to a long base sheet with specified gaps wherein a long medium is configured with the long base sheet and the medium pieces,
by the carrying part, carrying the long medium to the image forming part in a medium carrying direction,
by the cutting part, cutting the long medium being carried by the carrying part at a cut position in a gap between adjacent medium pieces, and
by the cut position determining part, determining the cut position in a gap between the adjacent medium pieces where the long medium is cut by the cutting part, wherein
the cut position determining part changes the cut position in a gap between a current pair of adjacent medium pieces according to either a leading edge length or a mark length of a mark for positioning,
the leading edge length is defined as a length between a leading edge of the long medium and a leading edge of a downstream-side medium piece of the long medium positioned adjacent to a previous cut position after cutting the long medium at the previous cut position, and
the mark for positioning is defined as a mark provided on each gap between the neighboring medium pieces on the base sheet of the long medium, and
the mark length is a length of the mark for positioning between the leading edge of the long medium and the leading edge of the downstream-side medium piece positioned adjacent to a previous cut position after cutter the long medium at the previous cut position.

* * * * *